Figure 1:
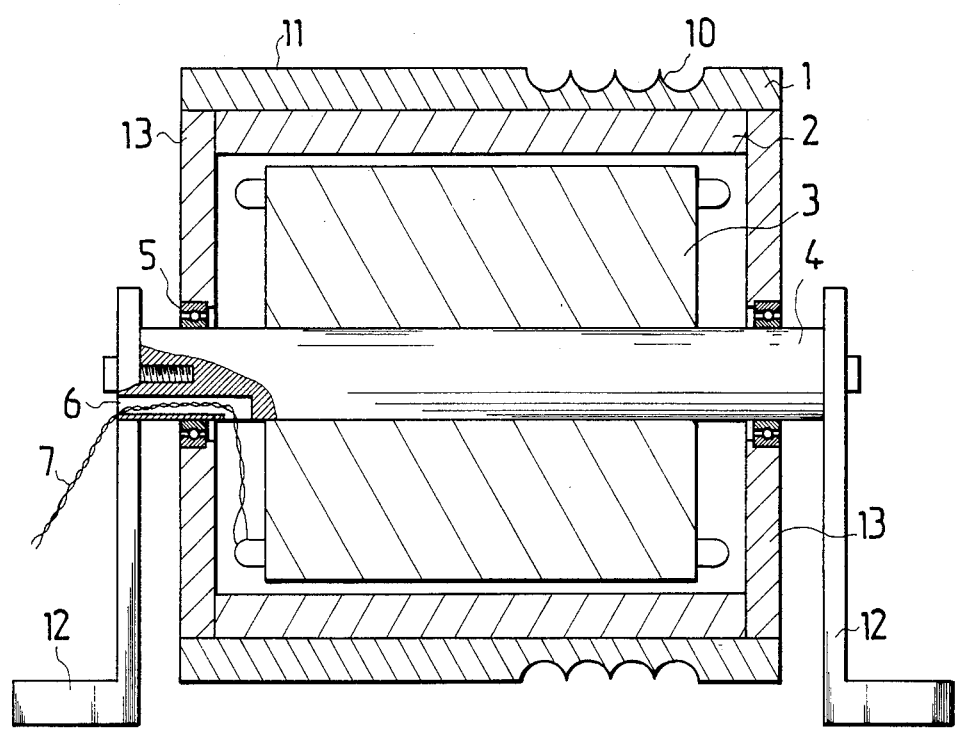

United States Patent [19]

Ivanto et al.

[11] Patent Number: 4,771,197
[45] Date of Patent: Sep. 13, 1988

[54] FREQUENCY CONVERTER-CONTROLLED SQUIRREL CAGE MOTOR

[75] Inventors: Osmo Ivanto, Erkylä; Matti Känkipuro, Hyvinkää, both of Finland

[73] Assignee: Elevator GmbH, Baar, Switzerland

[21] Appl. No.: 376,164

[22] Filed: May 7, 1982

[30] Foreign Application Priority Data

May 7, 1981 [FI] Finland ............................ 811414

[51] Int. Cl.$^4$ ............................................. H02K 7/00
[52] U.S. Cl. ..................................... 310/67 R; 310/58; 310/77; 310/160; 310/211; 187/20; 188/75; 414/246
[58] Field of Search ................. 310/76, 160, 67 R, 77, 310/67 A, 92, 66, 58, 211, 93; 187/20, 27; 188/75; 290/9, 45; 363/159–162; 414/246, 260, 486; 318/380, 757, 761, 56, 57, 60, 86, 87, 258, 259, 302, 362, 372, 375

[56] References Cited

U.S. PATENT DOCUMENTS

| 1,165,814 | 12/1915 | Tadey | 310/67 R |
|---|---|---|---|
| 1,206,586 | 11/1916 | Parvin | 187/20 |
| 4,038,666 | 7/1977 | Fuller | 310/67 R |
| 4,097,754 | 6/1978 | Farr | 310/67 R |

OTHER PUBLICATIONS

Electric Motors & Electronic Motor–Control Techniques (pp. 169 & 170) by J. Gottlieb; 1976; Howard W. Sams & Co. et al.; Indianapolis, K.C., N.Y.

Primary Examiner—R. Skudy
Attorney, Agent, or Firm—Martin Smolowitz

[57] ABSTRACT

The invention concerns a frequency converter-controlled squirrel cage motor particularly for use in elevator operation. The motor's stator is mounted on a stationary axle and the rotor rotating around the stator has been rotatably carried on the same axle. On the outer periphery of the rotor a cylinder has been mounted, carrying rope grooves and a brake surface for the elevator's lifting ropes and brake.

7 Claims, 1 Drawing Sheet

FREQUENCY CONVERTER-CONTROLLED SQUIRREL CAGE MOTOR

BACKGROUND OF THE INVENTION

The present invention concerns a frequency converter-controlled squirrel cage motor particularly for use in elevator operation. The stator of the motor is affixed to a non-rotating axle, and the rotor rotating about the stator is rotatably carried on the same axle. In squirrel cage motors the common inconvenience is their high rotational speed, which is difficult to regulate or control. It is particularly to be noted that in elevator driving always a gear transmission is required in addition to the squirrel cage motor, by which transmission it is possible to reduce the speed of rotation, because otherwise the motor would run altogether too fast. But such a transmission makes the construction more complex and heavier.

DESCRIPTION OF INVENTION

The object of the present invention is to provide a simple squirrel cage motor and which is reliable in operation, particularly for the running of elevators. The motor of the invention is characterized in that on the outer circumference of the rotor has been fixed a cylinder with rope grooves. The advantages of the motor of the invention include expressly simple construction, because the separate transmission and separate traction sheave are missing. Moreover the transferring of forces from the elevator lifting ropes to the mounting stand is easily accomplished; and among other things a long and thick shaft is avoided. The present transmissionless motor has a lower energy consumption compared with motors having a separate elevators with transmission.

One favourable embodiment of the invention is characterized in that the cylinder carries in addition to the rope grooves also a brake surface for brake shoes. Again, the advantage of the invention arises from simple construction, since the brake need not be separately mounted on the motor shaft.

Another advantageous embodiment of the invention is characterized in that the non-rotating axle has a cable entry for the electric supply leads for the motor. This is an advantageous and simple way to connect the motor with the mains. This is easy in the case of a squirrel cage motor because the inconveniences arising from collectors, encountered in equivalent D.C. motors, are avoided.

Figure 2:
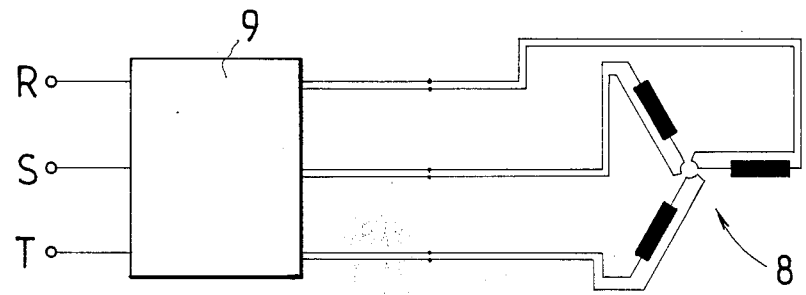

In the following, the invention is described in greater detail with the aid of an example with reference being made to the drawing, wherein:

FIG. 1 presents a motor according to the invention, longitudinally sectioned; and FIG. 2 shows the mode of connecting the motor to the mains.

This squirrel cage motor design according to the present invention differs from conventional designs in that slow rotation of the motor has been made possible through cycloconverter control, whereby the motor can be used as it is, e.g. as an elevator drive motor. A common squirrel cage motor is not proper for elevator driving without a reduction gear, because it rotates at a speed which is too high.

As shown in FIG. 1, the axle 4 of the motor is meant to be stationary. It has been fixed to stands 12, which conduct the support loads to the motor mounting base. On the axle 4, the stator 3 is integrally mounted, and the electric leads 7 coming to the stator run through a cable entry 6 provided in the axle 4. The rotor stack 2, rotating around the stationary stator 3, has been attached to the cylinder 1 in such a way that rotor and cylinder cannot move relative to each other. The cylinder 1 has been rotatably carried on the stationary axle 4 by means of end plates 13 and bearings 5. The cylinder 1 has been provided with lathe-machined rope grooves 10 in requisite number for the elevator's lifting ropes, in addition to which the cylinder 1 presents a brake surface 11 for the elevator's brake. It is then necessary to design the motor so that its diameter is consistent with the diameter of the cylinder 1, the size of which is determined by the diameter requirements imposed on the elevator's traction sheave, which is constituted by the rope grooves 10. Cooling may be provided for the motor by providing the cylinder 1 with radial ventilation apertures, and likewise apertures in the stator. Moreover, a fan may be installed to blow cooling air for the motor. The cycloconverter which renders possible the slow speed of rotation of the motor and thereby the entire motor design of the invention, is a means known in itself in the art, which changes the frequency of the electric current employed. Therefore the construction of the cycloconverter shall not be presented more closely here. The connection of the cycloconverter to the motor's electrical supply is shown in simplified presentation by FIG. 2, where the reference numeral 8 represents the motor and 9 represents the cycloconverter unit.

It is obvious to a person skilled in the art that the invention is not exclusively confined to the example disclosed in the foregoing, and that it may instead vary within the scope of the claims following below.

We claim:

1. A frequency converter-controlled squirrel cage motor particularly useful for elevator operation, said motor comprising: a stator integrally mounted on a supported non-rotating axle; a rotor rotatable around the stationary stator and rotatably carried on the axle; and a cylinder carrying rope grooves fixedly attached to the outer circumference of the rotor, whereby the rotor rotates the cylinder which operates ropes for lifting an elevator.

2. A motor according to claim 1, wherein said cylinder also carries a brake surface for being contacted by brake shoes.

3. A motor according to claim 1 or 2, wherein said axle has a cable entry for connecting electric supply leads to said stator.

4. A motor according to claim 1, wherein the axle is affixed to stands which conduct the support loads to a mounting base.

5. A motor according to claim 1, wherein said cylinder is provided with radial apertures for ventilation.

6. A motor according to claim 1, wherein the rotor rotational speed is controlled by a cycloconverter control means for connecting the motor to the electrical power supply.

7. A frequency converter-controlled squirrel cage motor useful for elevator operation, said motor comprising:
   (a) a non-rotatable axle supported at each end by stands, said axle having a cable entry at one end for electric supply leads;
   (b) a stationary stator integrally mounted on said non-rotatable axle;
   (c) a rotor rotatable around said stator and rotatably carried on said axle; and
   (d) a cylinder fixedly attached to the outer circumference of said rotor, said cylinder carrying rope grooves and a braking surface, whereby the rotor rotates the cylinder which operates ropes for lifting the elevator.

* * * * *